United States Patent
Hyde et al.

(10) Patent No.: US 7,021,329 B2
(45) Date of Patent: Apr. 4, 2006

(54) VAPORIZING PRESSURE REGULATOR

(75) Inventors: Daniel Neal Hyde, St. George, SC (US); Christopher James Thomson, Palatine, IL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 310 days.

(21) Appl. No.: 10/459,086

(22) Filed: Jun. 11, 2003

(65) Prior Publication Data

US 2004/0250855 A1 Dec. 16, 2004

(51) Int. Cl.
*F16K 49/00* (2006.01)

(52) U.S. Cl. .................. 137/341; 137/505.37

(58) Field of Classification Search ............. 137/341, 137/505.37
See application file for complete search history.

(56) References Cited

U.S. PATENT DOCUMENTS

| | | | |
|---|---|---|---|
| 1,988,289 A * | 1/1935 | Wittemann | 261/128 |
| 2,030,745 A | 2/1936 | Coffey | |
| 2,261,364 A * | 11/1941 | Grove | 137/341 |
| 4,092,963 A | 6/1978 | Vrooman | |
| 4,129,491 A * | 12/1978 | Obiaya | 204/410 |
| 4,188,919 A | 2/1980 | Bruce | |
| 4,452,215 A | 6/1984 | Glass | |
| 4,492,208 A | 1/1985 | Lent | |
| 4,528,966 A | 7/1985 | Lent et al. | |
| 4,705,008 A | 11/1987 | Kleinholz | |
| 4,811,720 A | 3/1989 | Katumata et al. | |
| 5,010,868 A | 4/1991 | Clements | |
| 5,029,553 A * | 7/1991 | Cox | 118/674 |
| 5,123,398 A | 6/1992 | Klaus et al. | |
| 5,257,640 A * | 11/1993 | Delajoud | 137/14 |
| 5,443,083 A * | 8/1995 | Gotthelf | 137/484.8 |
| 5,483,943 A | 1/1996 | Peters | |
| 5,584,467 A | 12/1996 | Harnett et al. | |
| 5,890,512 A * | 4/1999 | Gotthelf et al. | 137/484.6 |
| 6,076,359 A | 6/2000 | Jurcik et al. | |
| 6,145,494 A | 11/2000 | Klopp | |
| 6,267,105 B1 | 7/2001 | Bertossi | |
| 6,321,780 B1 | 11/2001 | Iwabuchi | |
| 6,345,611 B1 | 2/2002 | Hartman et al. | |

* cited by examiner

*Primary Examiner*—A. Michael Chambers
(74) *Attorney, Agent, or Firm*—RatnerPrestia

(57) ABSTRACT

A vaporizing pressure regulator is provided, comprising: a valve body having a flow path therethrough and a pressure responsive valve carried in the flow path to regulate the flow of a fluid; and a heat source operatively associated with the valve body to heat fluid in the flow path by thermal conduction through a portion of the valve housing. In another aspect of the invention, heating is enhanced by providing power to the heat source proportional to the difference between a measured temperature indicative of the temperature of the fluid and a predetermined temperature.

8 Claims, 5 Drawing Sheets

VAPORIZING PRESSURE REGULATOR

FIELD OF THE INVENTION

This invention relates to a pressure regulator and more particularly to a vaporizing pressure regulator with enhanced heating capability and control.

BACKGROUND OF THE INVENTION

Vaporizing pressure regulators are used to regulate fluid pressure and at the same time to maintain a predetermined fluid temperature. For example, vaporizing pressure regulators are used as part of a sample conditioning systems for on-line gas chromatographs to reduce the fluid pressure and to maintain the temperature of the fluid stream high enough to keep it in its gas phase. As another example, these types of regulators are also used to vaporize liquid hydrocarbons being analyzed in hydrogen sulfide detectors or other analytical equipment.

As noted above, the regulator must be able to reduce the fluid pressure and maintain a predetermined fluid temperature. Many of the regulators utilize complex heating arrangements that are relatively expensive and difficult to control. For example, one known regulator uses a tube that forms part of the fluid flow path and a heating oil bath surrounding the tube. The tube/oil bath arrangement is not only expensive and difficult to control, but it presents difficulty and expense in sealing the tubing and can, also, result in reliability problems.

SUMMARY OF THE INVENTION

The invention is, according to one aspect, a vaporizing pressure regulator configured to economically and effectively transfer heat from a heat source to a regulated fluid, and, in accordance with another aspect, a vaporizing regulator having a high-precision heating control circuit responsive to the desired temperature and the current temperature of the regulated fluid.

A vaporizing pressure regulator according to this invention comprises a valve body formed with a flow path extending therethrough and further comprises a pressure responsive valve carried in the flow path to regulate the flow of fluid in the flow path. The regulator further includes a heat source operatively associated with the valve body in close proximity to the flow path to heat the valve body whereby the valve body heats fluid in the flow path.

In accordance with another feature of the invention, a vaporizing pressure regulator according to this invention comprises a control circuit that provides power to the heat source proportional to the difference between a measured temperature indicative of the temperature of a fluid in the flow path and a predetermined temperature for that fluid media. By providing more power to the heat source when this temperature difference is greater, the vaporizing valve is heated more rapidly and as the measured temperature increases and approaches the predetermined temperature, the power provided to the heaters is reduced, preventing overheating. This proportional control enhances energy efficiency, heating response time, safety, and performance for the vaporizing regulator of the invention.

Both the foregoing general description and the following detailed description of preferred embodiments of the invention are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing may not be to scale. Included in the drawing are the following figures.

DETAILED DESCRIPTION OF THE INVENTION

Figure 1:
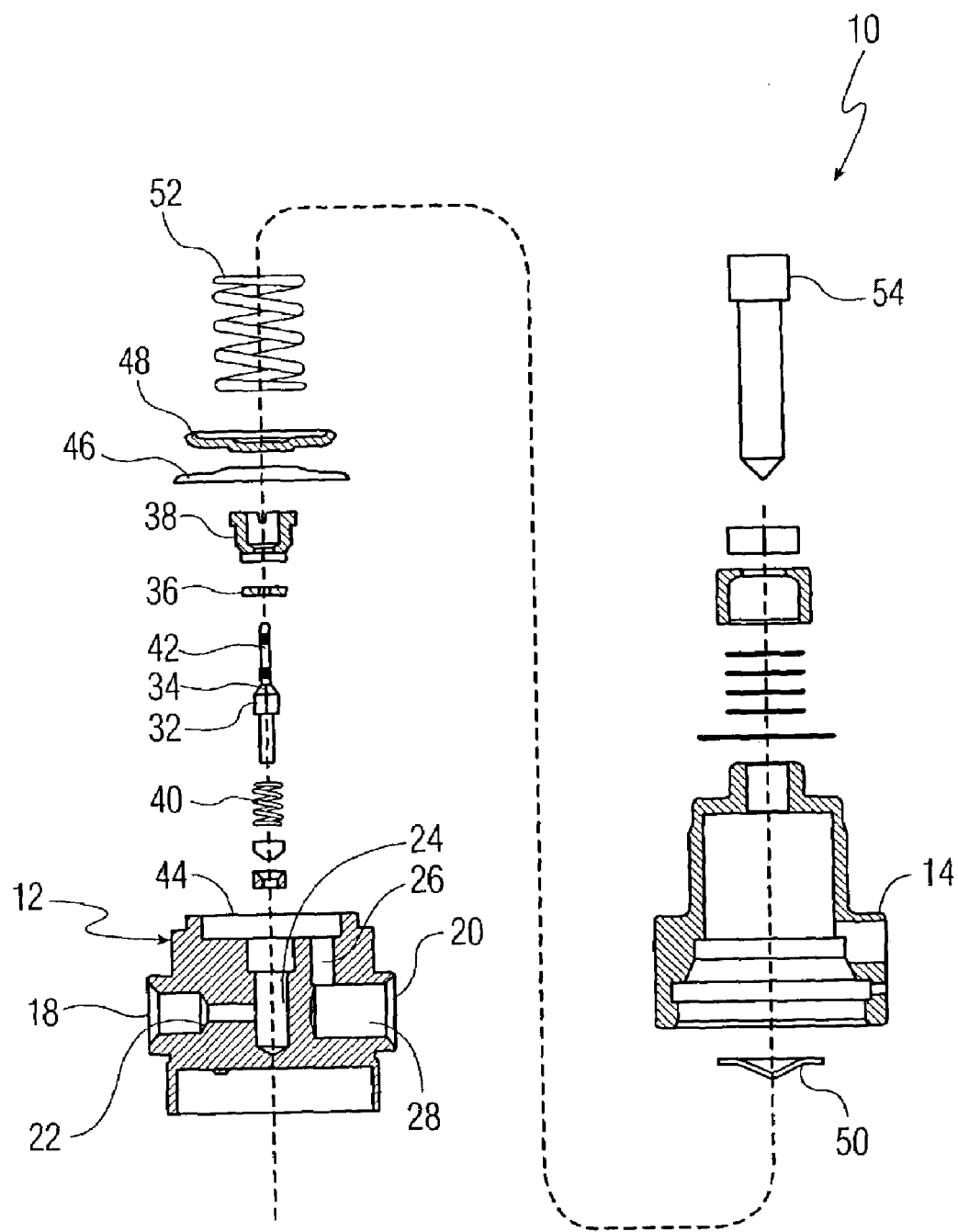
FIG. 1 is an exploded sectional view of a vaporizing regulator in accordance with this invention.

The drawing shows a preferred embodiment of a vaporizing regulator 10 having a valve body 12, a pressure regulating valve housing 14, and an electric controller housing 16.

The valve body 12 is a unitary piece having a generally cylindrical configuration with one end face adjacent the valve housing 14 and the opposite end face adjacent the controller housing 16. It may be formed from a stainless steel casting, with parts thereof machined to provide desired finishes and dimensions. While stainless steel is preferred, other materials having good heat conduction and corrosion, resistance may also be used.

Figure 3:
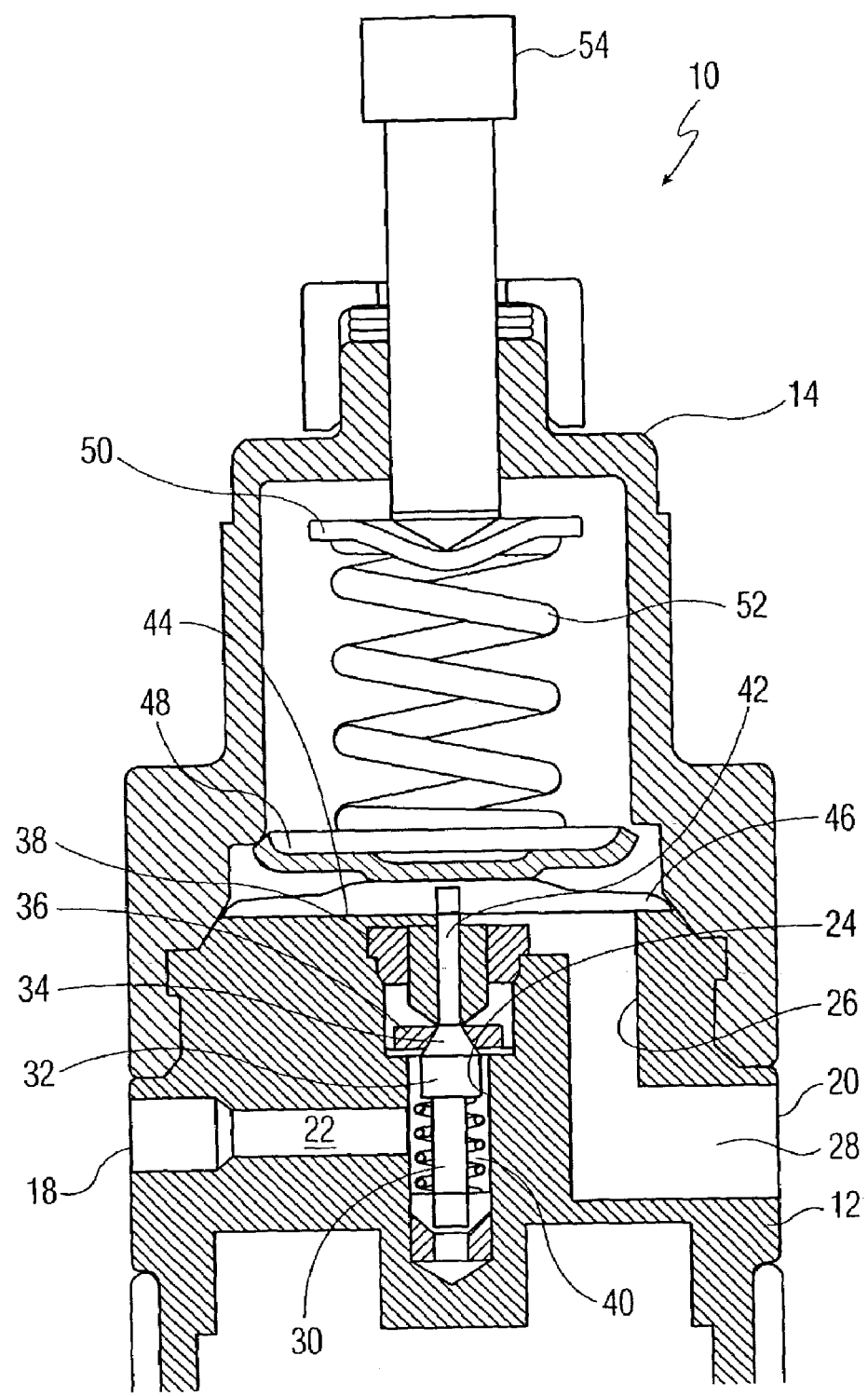
FIG. 3 is a sectional view similar to FIG. 2, but with the regulator rotated approximately 90 degrees from the position shown in FIG. 1.

As best shown in FIGS. 1 and 3, the valve body 12 is formed with a flow path extending from an inlet port 18 to an outlet port 20 which ports are disposed at spaced apart locations on the periphery of the valve body. The flow path includes a generally radial inlet bore 22 extending from the inlet port 18 to a longitudinal bore 24 open at the end face of the valve body adjacent the valve housing 14. The flow path also includes an axially extending bore 26 adjacent the longitudinal bore 24 and open at the same end face. Finally, the flow path includes a radial bore 28 extending from the axial bore 26 to the outlet port 20.

A pressure regulating valve assembly is located in the longitudinal bore 24 and may comprise any valve assembly operative to reduce the pressure of the fluid flowing through the valve from a relatively high inlet pressure to a relatively low outlet pressure. Examples of suitable valve assemblies are disclosed in U.S. Pat. No. 5,443,083 or U.S. Pat. No. 5,890,512, the disclosure of which patents are incorporated herein by reference thereto. The valve assembly disclosed herein is generally similar to the valve assemblies disclosed in the above-referenced patents. Note, however that the valve assemblies disclosed therein are used in LPG fuel delivery systems.

As shown in FIGS. 1 and 3, the valve assembly disclosed herein includes a valve member 30 slidably carried in the longitudinal bore 24. The valve member 30 is formed with an enlarged cylindrical portion 32 and a conical valve face 34 that cooperates with a valve seat 36 located intermediate the ends of the longitudinal bore 24. Conveniently the bore 24 may include a bore/counterbore configuration so that the valve seat 36 seats on the shoulder formed at the bore/counterbore interface. A hollow, externally threaded fastener 38 holds the valve seat 36 in place.

Both the cylindrical portion 32 and conical valve face 34 are located upstream of the radial inlet passage 22. The smaller diameter end of the conical valve face 34 is adjacent the valve seat 36 so that fluid flow is metered as the slideable valve member 30 moves up and down (as shown in the drawing) between its closed and open positions, respectively. One end of a spring 40 seats in the closed end of the longitudinal bore 24 and the other end of the spring seats against the enlarged cylindrical portion 32 to urge the conical valve face 34 to its closed position against the valve seat 36.

Extending from the conical valve face 34 toward the pressure regulating valve housing 14 is a valve stem 42. The stem 42 projects beyond the end face of the valve body containing the openings of the bores 24 and 26 and into a pressure chamber 44. It will be appreciated that the pressure chamber 44 is part of the flow path and communicates between the bores 24 and 26. The pressure chamber 44 is formed between the end face of the valve body 12 containing the open ends of the bores 24 and 26 and a flexible diaphragm 46, the outer periphery of which is clamped between the valve body 12 and the valve housing 14. One face of the diaphragm 46 bears against the valve stem 42 and the other face forms, with the hollow interior of the valve housing 14, a control chamber in which is contained a diaphragm plate 48 seated on the diaphragm 46 and a spring plate 50 whose position is adjustably determined by an adjusting screw 54. Between the plates 48 and 50 is a coil spring 52 that biases the valve member 30 to an open position where the conical valve face 34 is spaced from the valve seat 56. An adjusting screw 54 is threaded through the end face of the valve housing 16 to compress or relax the spring 52 and, thus, adjust the force exerted against the diaphragm plate 48, diaphragm 46 and valve member 30.

By turning the adjusting screw 54 in one direction, the spring 52 is compressed and, as will be explained hereafter, the outlet pressure provided by the regulator 10 will increase; by turning the screw in the other direction the spring 52 is relaxed and the outlet pressure will decrease. Thus, adjusting screw 54 regulates the outlet pressure and its position is set to maintain a predetermined pressure for the particular fluid being regulated.

After the predetermined pressure is set into the regulator 10 by the adjusting screw 54, any imbalance between the outlet pressure and the predetermined pressure causes a corresponding reaction in the diaphragm 46 and an adjustment of the position of the conical valve face 34 relative to the valve seat 36. If the outlet pressure rises above the predetermined pressure, the pressure in the pressure chamber 44 increases and lifts the diaphragm 46 away from the adjacent end face of the valve body 12 so that the conical valve face 34 moves toward the valve seat 36. Fluid flow is reduced as is the outlet pressure. If the outlet pressure falls below the predetermined pressure, the spring 52 forces the diaphragm 46 downwardly toward the adjacent end face of the valve body 12 so that the conical valve face 34 moves away from the valve seat 36. Fluid flow is increased as is the outlet pressure. At equilibrium the valve face 34 and the valve seat 36 assume a position which maintains the desired outlet pressure and provides the required flow.

A heat source is operatively associated with the valve body to heat the fluid in the flow path. In the embodiment disclosed herein, the heat source is in close proximity to the flow path and heats the valve body. The heat is transferred through the valve body 12 and heats the fluid in the flow path. In those applications where the fluid must be maintained and discharged in the gas or vapor phase, the fluid will be maintained in that phase regardless of the fluid volume.

Figure 2:
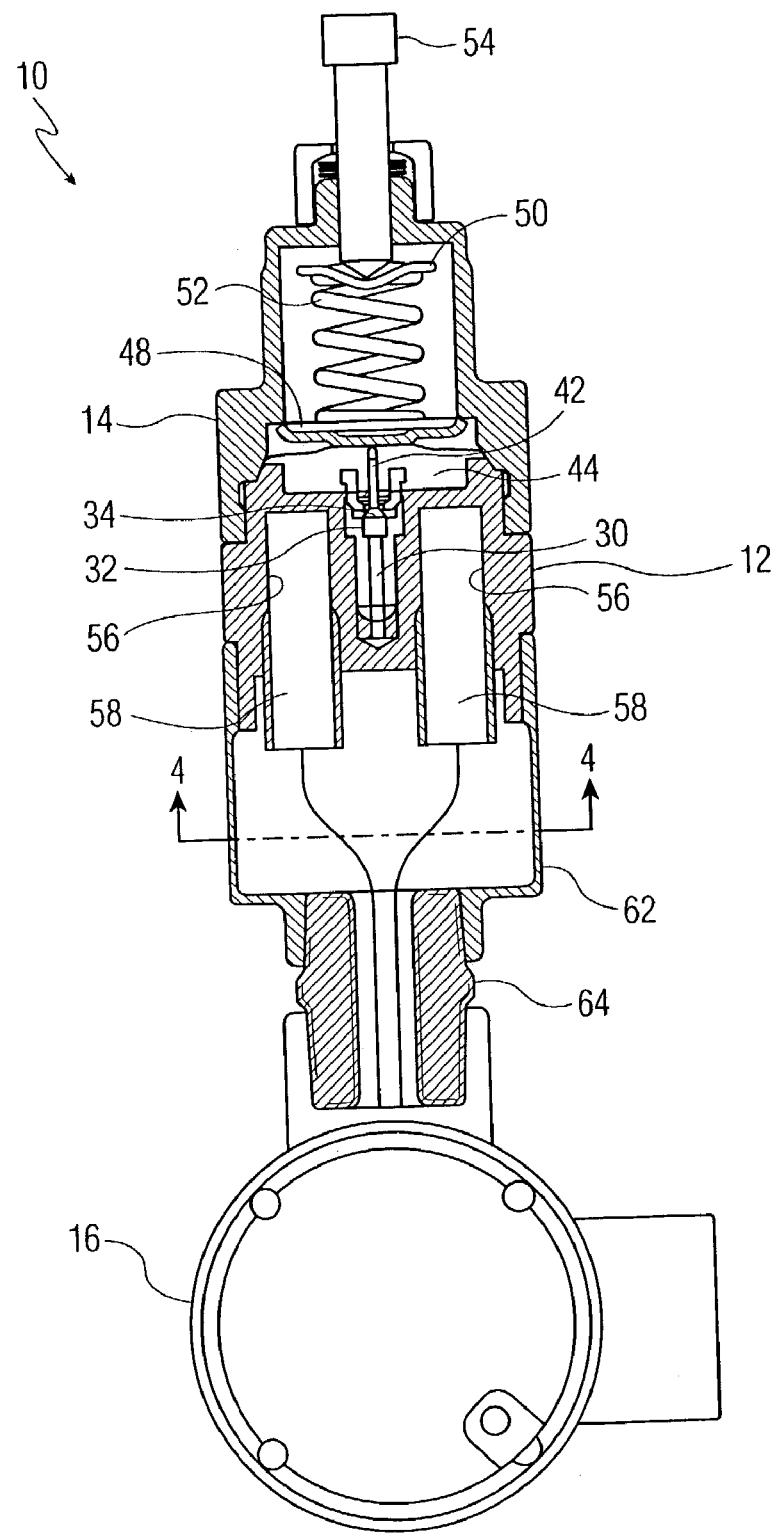
FIG. 2 is a sectional view taken along the longitudinal axis of an assembled vaporizing pressure regulator according to the invention with parts omitted for clarity.
Figure 4:
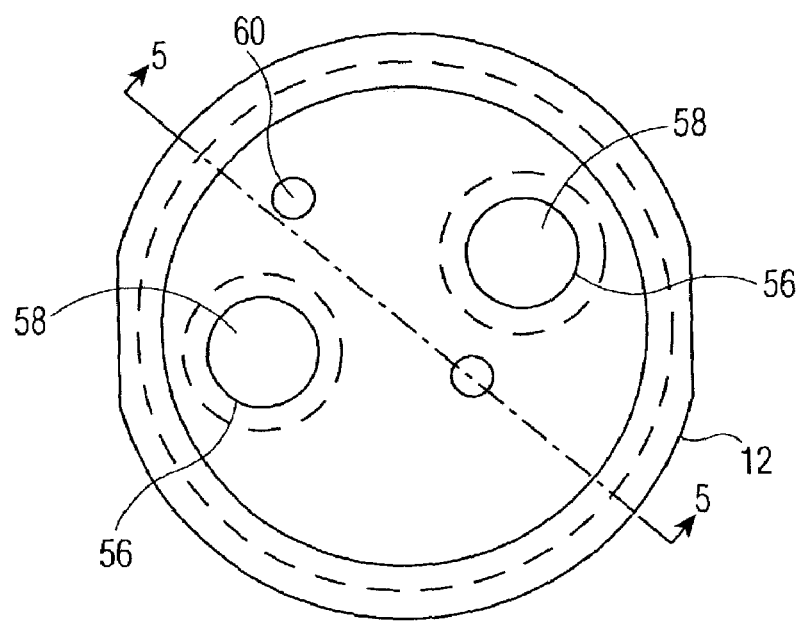
FIG. 4 is a plan view of the vaporizing regulator of FIG. 1 looking from the lines 4—4 of FIG. 2.

The valve body 12 can be heated in various ways, eg., by electric heaters, steam, etc. In the embodiment shown herein and as best seen in FIGS. 2 and 4 of the drawing, the valve body 12 is formed with a pair of bores 56, 56 that extend from the end face of the valve body 12 adjacent the controller housing 16 toward the other end face of the body. The end faces of the bores 56, 56 terminate very close to the pressure chamber 44 and are separated from that chamber, and thus the fluid therein, by a portion of the valve body. Each bore 56 is parallel to the longitudinal bore 24 and is in close proximity thereto. The portions of the valve body 12 between the bore 56 and the flow path provide a heat transfer path as will be explained.

Each bore 56 carries an electrically powered heater 58 such as a resistance heater carried in a cartridge to heat the valve body 12. Heat is transferred through the aforementioned heat transfer path and, thus, heats the fluid in the flow path. If desired, a thin film of heat conductive paste can be disposed between the cylindrical walls and end faces of the bores 56 to enhance thermal conduction. The paste may comprise boron nitride or the like and has thickness of about 0.003 inches to about 0.006 inches. To further optimize the heat transfer, the thickness of the valve body between the bores and the flow path have a thickness of about 0.25 inches to about 0.75 inches. The heaters 58 are wired into an electrical circuit located in the controller housing 16 for powering and controlling their operation.

A temperature measuring sensor 60 is also disposed in the valve body 12 in the region of the heat conductive path for measuring the temperature in the heat path. This measured temperature is proportional to the temperature of the fluid and is an indication of the temperature of the fluid in the flow path. The sensor 60 could be located in the flow path to measure the fluid temperature directly, but this arrangement raises reliability and expense issues with aspect to sealing the sensor and the flow path.

In the preferred embodiment of the invention disclosed herein the temperature measuring sensor 60 is a thermocouple located in a bore 62 which is generally parallel to the bores 24, 26 and 56 and it (the sensor 60) is located between the heat source 58 and the longitudinal bore 24. Sensors such as thermistors or resistance measurement detectors can be used in place of a thermocouple. The sensor 60 is thus located adjacent the flow path and outputs an electrical signal indicative of the temperature of the fluid and it too is wired into circuitry located in the controller housing 16.

Before describing the circuitry in the housing 16, it is noted that the valve body 12 is coupled to the controller housing 16 through threaded engagement between the valve body and a housing 62 which, in turn, is in threaded engagement with an insulated connector 64. The connector 64 is coupled to the controller housing 16.

Figure 6:
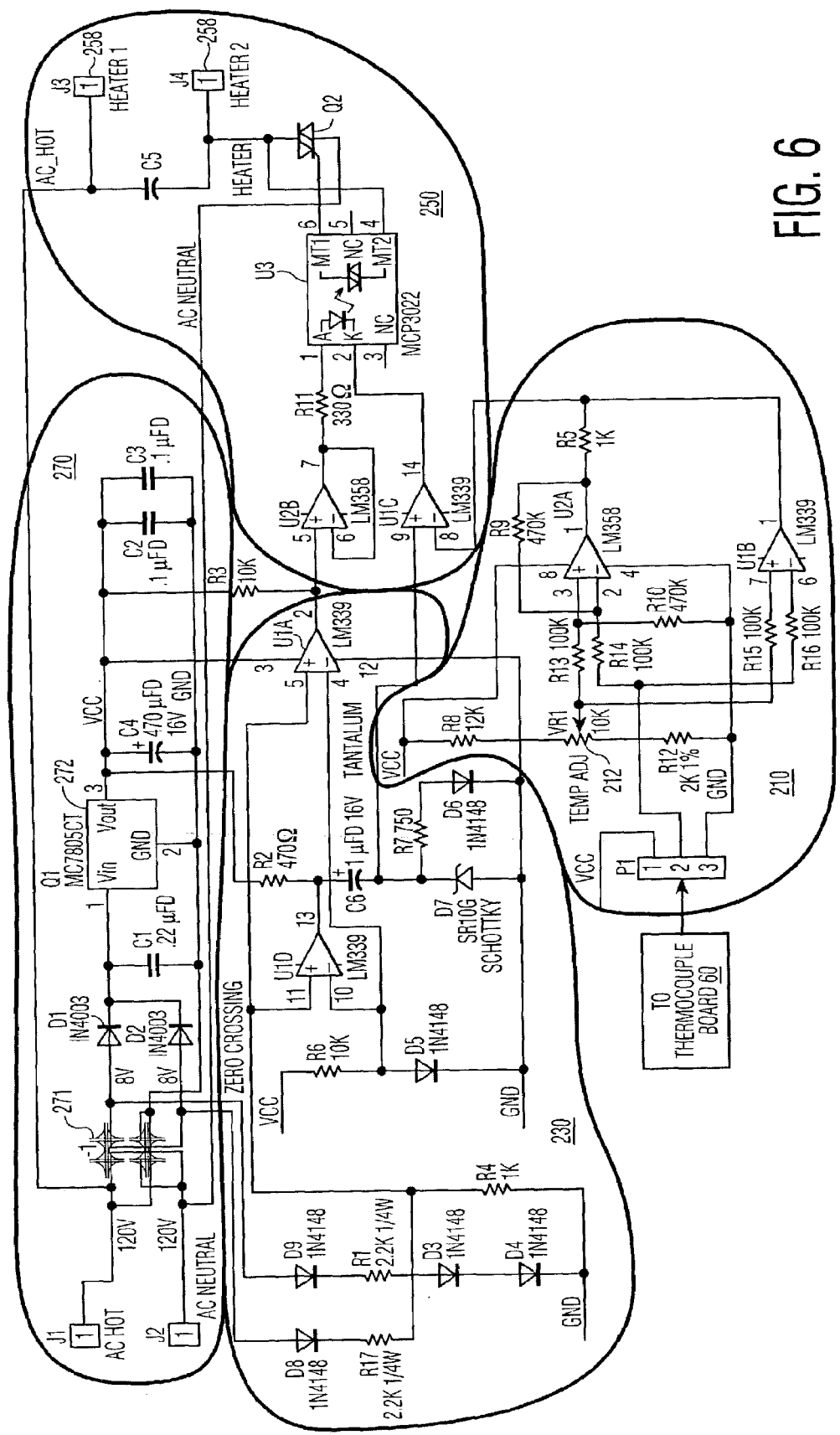

Referring now to FIG. 6, a control circuit is shown for providing power to the heaters 58. In the exemplary embodiment illustrated in FIG. 6, the power provided to the heaters is proportional to the difference between the measured temperature of the fluid media as provided by thermocouple 60 and a predetermined temperature. In the embodiment disclosed herein, the fluid in the flow path is to be delivered in the vapor state so that the predetermined temperature is the vaporization temperature of the fluid (or approximately the vaporization temperature of the fluid). The control circuit comprises: a comparator circuit 210, a zero crossing circuit 230, a switching circuit 250, and a power supply 270. The heating time and thermal resolution of the vaporizing regulator are enhanced by the control circuitry of the present invention.

The comparator circuit 210 receives a signal from the temperature sensor 60 proportional to the temperature measured by the sensor and, as noted, indicative of the fluid temperature. For example, the signal from the temperature sensor may be conditioned using a thermocouple signal conditioning block (e.g., a circuit including a cold-junction-compensator and an instrument amplifier) prior to being transmitted to comparator circuit 210. In comparator circuit 210, the sensor signal is compared to a signal from an adjustable potentiometer 212. The adjustable potentiometer 212 is adjusted to a resistance corresponding to the desired predetermined temperature (e.g., vaporization temperature of the fluid). A signal proportional to the difference between the measured temperature and the predetermined temperature is provided to switching circuit 250.

Figure 5:
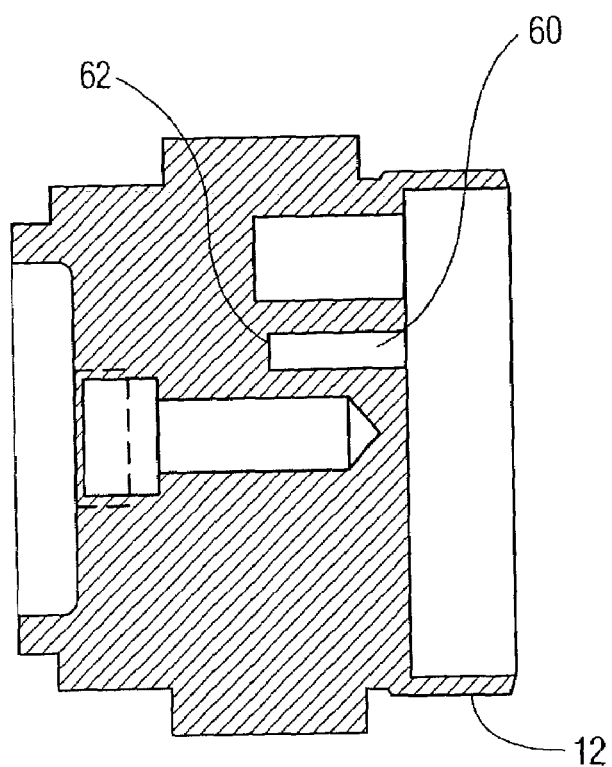
FIG. 5 is a sectional view of the valve body taken along the line 5—5 of FIG. 4; and, FIG. 6 is an electrical schematic of a heating control circuit for a vaporizing pressure regulator according to a preferred embodiment of the invention.

Power supply 270 receives a 120 volt AC input which is tied directly to the heaters 58 as shown in FIG. 5. This 120 volt AC input is connected to a center-tapped transformer 271 that transforms the voltage to a lower AC voltage, for example, 8 V AC. This lower AC voltage is then rectified and regulated (by regulator 272) to provide a lower voltage DC source to power the low voltage components of the circuit.

Zero-crossing circuit 230 receives a low-voltage signal from the power supply and rectifies it. The rectified signal is converted to a pulsed signal and fed to switching circuit 250 (through U1A). This zero-crossing signal is converted to a pulsed signal and fed to the switching circuit 250 to assure that switching occurs when the AC voltage wave crosses zero volts. The zero-crossing signal is also converted to a pulsed signal by amplifier (U1D) and fed to a capacitor (C6) to provide a pulsed signal with a discharge decay shape to the switching block for controlling the duration of heating.

Switching circuit 250 receives the modified zero-crossing signal from (U1A) and feeds it through an amplifier (U2B) at unity gain to provide a trigger signal to a non-zero-crossing triac (U3) to insure that it, in turn, triggers a power triac (Q2) at the zero-crossing point. The duration of the trigger signal is determined by the output of an amplifier (U1C) which is a combination of the modified zero-crossing signal from capacitor (C6) and the signal from the comparator block 210. As the signal from the comparator block increases, indicating that more heat is needed, the duration of the sinking pulse from amplifier (U1C) increases, keeping power to the power triac (Q2) for a longer portion of the power cycle. The power triac (Q2) switches the neutral line of the 120 VAC power energizing the heaters for a duration that is responsive to the difference between the measured temperature and the set temperature.

Although illustrated and described above with reference to certain specific embodiments, the present invention is nevertheless not intended to be limited to the details shown. Rather, various modifications may be made within the scope and range of equivalents of the claims and without departing from the spirit of the invention.

What is claimed:

1. A vaporizing pressure regulator comprising:
   a valve body having a flow path extending therethrough and a pressure responsive valve carried in said flow path to regulate the flow of a fluid through said flow path;
   said valve body being formed with a cavity in close proximity with the flow path; and an electrically powered cartridge heater located in the cavity to heat the valve body whereby the valve body heats fluid in the flow path; and
   a film of heat conductive paste disposed between said cartridge heater and the wall of said cavity.

2. The regulator recited in claim 1 wherein said heater is separated from said flow path by a portion of said valve housing having a thickness of between about 0.025 inches and about 0.075 inches.

3. The regulator recited in claim 1 wherein said film has a thickness of between about 0.003 inches and about 0.006 inches.

4. The regulator recited in claim 1 including a temperature measuring sensor carried by the valve body for providing an electrical signal indicative of the temperature of fluid in the flow path.

5. The regulator of claim 4 further comprising a controller responsive to the sensor for providing power to the heat source proportional to the difference between the temperature measured by the sensor and a predetermined temperature.

6. A vaporizing pressure regulator comprising:
   a valve body having a flow path extending therethrough;
   a valve carried in the flow path to regulate the flow of a fluid flowing through the flow path;
   a heat source operatively associated with the valve body for heating fluid in the flow path;
   a temperature measuring sensor contacting said valve body for measuring the temperature thereof and providing an electrical signal indicative of the temperature of the fluid in the flow path; and
   a control circuit responsive to the electrical signal for controlling the heat source and maintaining a predetermined fluid temperature in the flow path, said control circuit regulating the heat source such that the heat source provides heat proportional to the difference between the temperature measured by the sensor and a predetermined fluid temperature.

7. The regulator of claim 6 wherein the control circuit provides pulsed power to the heat source that is proportional to the difference between the measured temperature and the predetermined temperature.

8. A vaporizing pressure regulator comprising:
   a valve body having a flow path extending therethrough;
   a pressure responsive valve in the flow path for regulating the flow of fluid through the flow path;
   an electrically powered heater carried in said valve body proximate to said flow path for heating the valve body and a fluid flowing through the flow path;
   a temperature measuring sensor operatively associated with the valve body for providing a signal indicative of the fluid temperature in the flow path; and
   a control circuit providing power to said heater proportional to the difference between a measured temperature signal from the sensor and a signal representative of a predetermined fluid temperature;
   said control circuit comprising a power circuit distributing power to the heater, a comparator circuit comparing the measured temperature signal from the sensor with the predetermined fluid temperature, the comparator circuit providing a pulsed switching signal that is proportional to the difference between the measured temperature signal and the predetermined fluid temperature and a switching circuit switching power to said heater corresponding to said switching signal.

* * * * *